United States Patent [19]
Okabe

[11] Patent Number: 5,933,201
[45] Date of Patent: Aug. 3, 1999

[54] POLYMER DISPERSION LIQUID CRYSTAL RECORDING MEDIUM AND METHOD AND APPARATUS FOR REPRODUCING INFORMATION

[75] Inventor: Masato Okabe, Tokyo, Japan

[73] Assignee: Dai Nippon Printing Co., Ltd., Tokyo, Japan

[21] Appl. No.: 08/751,255

[22] Filed: Nov. 18, 1996

Related U.S. Application Data

[63] Continuation of application No. 08/199,293, filed as application No. PCT/JP93/00900, Jun. 30, 1993, abandoned.

[30] Foreign Application Priority Data

Jun. 30, 1992 [JP] Japan ................................. 4-173030
Apr. 27, 1993 [JP] Japan ................................. 5-101280

[51] Int. Cl.[6] .......................... G02F 1/135; G02F 1/1333; G02F 1/13
[52] U.S. Cl. ................................. 349/25; 349/86; 349/93; 349/1
[58] Field of Search .................. 349/1, 25, 86, 349/93

[56] References Cited

U.S. PATENT DOCUMENTS

| | | | |
|---|---|---|---|
| 3,655,971 | 4/1972 | Haas et al. | 430/20 |
| 3,795,517 | 3/1974 | Sutton | 349/25 |
| 4,672,014 | 6/1987 | Joiner et al. | 430/20 |
| 5,170,271 | 12/1992 | Lackner et al. | 349/86 |
| 5,200,283 | 4/1993 | Nakano et al. | 430/20 |
| 5,260,815 | 11/1993 | Takizawa | 349/25 |
| 5,301,046 | 4/1994 | Konuma et al. | 359/51 |
| 5,304,438 | 4/1994 | Konno et al. | 349/138 |
| 5,313,288 | 5/1994 | Takanashi et al. | 349/86 |
| 5,486,936 | 1/1996 | Fujikake et al. | 349/86 |

FOREIGN PATENT DOCUMENTS

| | | | |
|---|---|---|---|
| 2-55337 | 2/1990 | Japan | 359/72 |
| 3-121418 | 5/1991 | Japan . | |
| 4-12329 | 1/1992 | Japan . | |
| 4-70864 | 3/1992 | Japan . | |

Primary Examiner—William L. Sikes
Assistant Examiner—Toan Ton
Attorney, Agent, or Firm—Sughrue, Mion, Zinn, Macpeak & Seas, PLLC

[57] ABSTRACT

The present invention relates to a polymer dispersion liquid crystal recording medium containing liquid crystals dispersed and fixed in resin, as well as to a method and an apparatus for reproducing information. In particular, when a medium as shown in FIG. 6 is used, the information recorded on the liquid crystal layer can be read with sufficient contrast by making the photoconductive layer (13) transparent to blue or ultraviolet light, and by making the wavelength of the reading light match the wavelength of the blue or ultraviolet light. When image reading is performed as illustrated in FIGS. 3 and 7, a white light source is used as light source (4), and a filter (5) is placed between light source (4) and the liquid crystal medium (20); thus, only blue or ultraviolet light enters the liquid crystal medium. After passing through the liquid crystal medium (20), the light is converted to an electric signal by a photoelectric converter (6).

6 Claims, 14 Drawing Sheets

30 ⋯ Power source

Ultraviolet light reading

Reading signal

White light reading

Reading signal

POLYMER DISPERSION LIQUID CRYSTAL RECORDING MEDIUM AND METHOD AND APPARATUS FOR REPRODUCING INFORMATION

This is a Continuation of application Ser. No. 08/199,293 filed Feb. 28, 1994, now abandoned, filed as PCT/JP93/00900 filed Jun. 30, 1993.

FIELD OF THE INVENTION

The present invention relates to a polymer dispersion liquid crystal recording medium with liquid crystals dispersed and fixed in resin, and also to a method and an apparatus for reproducing information.

BACKGROUND TECHNIQUE

In a macromolecular/liquid crystal composite film with smectic liquid crystals dispersed and fixed in UV-setting type resin, it is known that smectic liquid crystals are in a non-oriented state when prepared and are opaque because of scattering caused by the difference of refractive indices between the liquid crystals and resin, and that, when voltage is applied, the liquid crystals are oriented in the direction of the electric field, scattering is eliminated and liquid crystals are turned to transparent because the refractive index concurs with that of the polymer. The composite film has a memory property, and even when voltage is applied once to orient the liquid crystals and the electric field is removed thereafter, the oriented state is maintained. This oriented state can be turned again to a non-oriented state when the medium is heated to change the liquid crystal layer to a isotropic phase and is cooled down to room temperature. When the composite film is formed on glass where a transparent electrode such as ITO is deposited and a photoconductive layer formed on glass where the ITO electrode is deposited and these are placed face-to-face with an air gap between them, and when image exposure is performed from the direction of the photoconductive layer side and voltage is applied between the two electrodes at the same time, high resolution image recording can be performed in an analog manner. In this case, on the portion exposed to light, resistance of the photoconductive layer decreases, and electric current increases compared with that of the dark portion. Voltage is applied more on the liquid crystal medium opposed to it than on the dark portion. Thus, liquid crystals are oriented and turned to transparent, and an image can be recorded.

FIG. 1 shows an arrangement of an image recording apparatus using a polymer dispersion liquid crystal medium as described above. In the figure, reference numeral 10 represents a photosensitive member, and 20 a liquid crystal recording medium. The photosensitive member 10 comprises a transparent electrode 12 and a photoconductive layer 13 sequentially laminated on a transparent support member 11, and the liquid crystal recording medium 20 comprises an electrode 22 and a polymer dispersion liquid crystal layer 23 sequentially laminated on a support member 21. As the photoconductive layer, a single photoconductive layer added with amorphous selenium, amorphous silicon, etc. as an inorganic conductive layer or added with trinitrofluorenone to polyvinyl carbazole as an organic photoconductive layer may be used. Alternatively, a photoconductive layer may be used, which comprises an electric charge generating layer where an azo pigment dispersed on a resin such as polyvinyl butyral and an electric charge migration layer where a hydrazone derivative is mixed with a resin such as polycarbonate and both layers are laminated each other. As the electrode 22 of the liquid crystal recording medium, a transparent electrode such as ITO or non-transparent electrode such as aluminum electrode may be used. (FIGS. 1–7 represent prior art.)

When the photosensitive member 10 and the liquid crystal recording medium 20 are placed face-to-face and voltage is applied between the two electrodes 12 and 22 from a power source 30, and visible light is irradiated as a writing light, the electrical conductivity of the photo-conductive layer 13 changes according to the intensity of light exposure, and voltage applied on the liquid crystal layer 23 changes. As a result, the oriented state of the liquid crystal layer is changed, and this state is maintained even after the applied voltage is turned off and the electric field is removed, and image information is thus recorded.

Information can also be recorded as follows: As shown in FIG. 2(a), the liquid crystal recording medium is oriented by applying voltage over the entire surface of the medium using a corona charger 32 to turn the entire surface to transparent. Then, as shown in FIG. 2(b), the liquid crystal layer is partially heated using a thermal head 33 to turn it to a non-oriented state.

The information thus recorded can be converted to an electric signal by a reader shown in FIG. 3. Specifically, of the light of a light source 4, only the light beam having an adequate wavelength is irradiated on a liquid crystal recording medium 20 through a filter 5 and it is modulated on the liquid crystal recording medium because transmittance differs according to the recorded information. The modulated light is received by a photoelectric converter 6 such as a CCD line sensor and is converted to an electric signal. This electric signal can be outputted by a CRT or printer when necessary.

As shown in FIG. 4 and FIG. 5, an information recording medium is also proposed, in which a photosensitive member and a liquid crystal recording member are laminated and integrated.

FIG. 4 shows an information recording medium, in which a photosensitive member 10 comprising a transparent electrode 12 and a photoconductive layer 13 laminated onto transparent support member 11 and a liquid crystal recording medium 20 having a polymer dispersion liquid crystal layer 23 laminated on a transparent electrode layer 22 are integrated. FIG. 5 shows an information recording medium, in which a photosensitive member 10 and a liquid crystal recording medium 20 are integrated via a dielectric intermediate layer 16. In case of the integrated information recording medium, there is no need to have the dielectric intermediate layer if the photoconductive layer is made of inorganic material, but the intermediate layer may be required if an organic photoconductive layer is used. In this case, an inorganic oxide film such as $SiO_2$ or a layer coated with fluororesin such as Saitop (Asahi Glass Co., Ltd.), or polyparaxylylene may be used.

To record information on the integrated information recording medium, voltage is applied between the transparent electrode layers 12 and 22 from the power source 30, and visible writing light is irradiated on the information recording medium. Then, the conductivity of the photoconductive layer 13 changes according to light intensity, and the electric field applied on the liquid crystal layer 23 changes. As a result, the oriented state of the liquid crystal medium changes according to the intensity of the writing light, and the state is maintained even after the electric field is turned off. To read the information thus recorded, reading light is irradiated on the information recording medium from a light source 4. As the light source 4, a white light source such as a xenon lamp, halogen lamp, etc. or laser beam may be used. The incident light is modulated on the information recording medium and is converted to an electric signal by a photoelectric converter 6 such as a photodiode, CCD line sensor, etc.

In the polymer dispersion liquid crystal layer, the difference between transmittance in a oriented state and transmittance in a non-oriented state is small. When white light is used as a writing light, contrast is low, and the read image is not satisfactory. Namely, the polymer dispersion liquid crystal layer has a spectral property as shown in FIG. 8. In FIG. 8, T1 represents transmittance of a liquid crystal layer in a non-oriented state, and T2 shows transmittance of a liquid crystal layer in an oriented state. As it is evident from the property T1, transmittance to light between visible light and infrared light is high even in an non-oriented state. Because the contrast ratio (ratio of T1 to T2) with an oriented state is small, a satisfactory image cannot be obtained, and only the electric signal with a lower S/N ratio can be obtained. For this reason, when the image is read using white light as the reading light, visible light and infrared light pass through even the unreacted portion, and satisfactory contrast cannot be obtained.

In a conventional type photosensitive member, absorption in the ultraviolet and blue range is high, and the light of the ultraviolet or blue range does not pass through the photosensitive layer in the case of an information recording medium, which comprises a photosensitive member and liquid crystal recording layer laminated to each other. Thus, the image cannot be read.

When one tries to read the recorded image at high resolution, noise similar to the granularity noise of silver salt negative film is measured depending upon the condition of phase separation of the liquid crystal layer and polymer, and only the image totally coarse and rough can be obtained.

DISCLOSURE OF THE INVENTION

To solve the above problems, it is an object of the present invention to provide a polymer dispersion liquid crystal recording medium, by which it is possible to improve contrast and to reduce granularity noise, and also to a method and an apparatus for information reproduction.

To attain the above object, the integrated type information recording medium with a photosensitive member and a liquid crystal recording layer laminated each other according to the present invention is characterized in that a photoconductive layer has such a property that light with a wavelength in the blue or ultraviolet range passes through it. An organic photosensitive member comprises two layers: an electric charge generating layer and an electric charge transport layer. The electric charge generating layer is sufficiently thin and image reading cannot be impaired even when a material having any absorption property is used. The electric charge transport layer is thick, and there is a restriction on the light for image reading depending upon the absorption property. The medium of the present invention is characterized in that an electric charge transport material is used as the electric charge transport layer so that light with a wavelength in the blue or ultraviolet range passes through it when the electric charge transport layer is formed in a thickness of 5 to 30 μm.

There is no need that the light passes through the electric charge transport layer over the entire range of ultraviolet or blue light, and it will suffice if the light with a certain wavelength in this range passes through it. Here, it is supposed that ultraviolet light has wavelength in the range of 320–400 nm, and blue light is in the range of 400–500 nm. It is preferable that transmittance is as high as possible, but it will suffice that light passes through the electric charge generating layer and the electric charge transport layer in a laminated condition by 1 percent by weight or more, and, more preferably, by 10 percent by weight or more.

With regard to the reading of the recording on an integrated type information recording medium, the wavelength of the reading light is determined according to the absorption property of the photosensitive member, and light having the shortest wavelength among the light passing through the photosensitive member is used as the reading light.

After studying the wavelength dependency of the reading light of the reading signal, it has been found that an image signal having contrast higher in the order of blue, green, and red was obtained, and granularity noise is most extensively observed in the green range. As a result, it was found that a better image can be obtained by reading the light, exempting red and green light from normal image reading light. Specifically, the present invention is characterized in that a satisfactory image signal is obtained by the use of blue light as the reading light.

Also, the present invention is characterized in that ultraviolet light is irradiated on a liquid crystal recording medium as reading light and the recorded information is read by transmission light. As it is evident from FIG. 8, when ultraviolet light of 400 nm or lower is used, transmittance in a non-oriented state is low and the contrast ratio to transmission state increases, and a satisfactory image can be obtained. To irradiate ultraviolet light to the liquid crystal recording medium, a filter to transmit only ultraviolet light is installed between the light source and the liquid crystal recording medium. As such a filter, an interference filter with a laminated inorganic dielectric layer, colored glass filter, or a combination of a plurality of these filters may be used.

In general, the filters as described above have low transmittance, and it is necessary to irradiate light of considerable intensity from a light source in order to receive modulated light by a photoelectric conversion device. If such a light source is used, heat is generated and energy efficiency is low, and this is not desirable. If the receiving light intensity of the photoelectric conversion device is low, accumulation is longer. This leads to longer reading time, and the S/N ratio decreases.

The present invention is characterized in that an image forming lens made of quartz glass or fluorspar is placed between the information recording medium and the photoelectric converter, and that quartz glass or fluorspar is used in the window material of the photoelectric converter. The lens is arranged with the purpose of forming an image on the photoelectric converter from modulated light, and transmittance is low in the ultraviolet range. In particular, transmittance rapidly decreases in a range lower than 360 nm. This is due to the material of the lens. When a material to transmit ultraviolet light better such as quartz glass, fluorspar, etc. is used as the lens material, light with high intensity can be received even from a weak light source. Similarly, window material of the photoelectric conversion device weakens the intensity of ultraviolet ray. Thus, it is possible to reduce the load of the light source by using quartz as window material and by forming a reflection preventive film.

Also, the present invention is characterized in that a cold mirror for reflecting blue light and/or ultraviolet light only is used as a part of the illuminating optical system. When a light from light source is directly irradiated to a filter, which transmits ultraviolet light, irradiation energy is too strong and the filter may be deteriorated. For this reason, when the cold mirror is used and infrared light and visible light are reduced in the light to be irradiated, damage caused by light may be reduced.

BEST MODE FOR CARRYING OUT THE INVENTION

In the following, description will be given on embodiments of the present invention.

EXAMPLE 1

Figure 1:
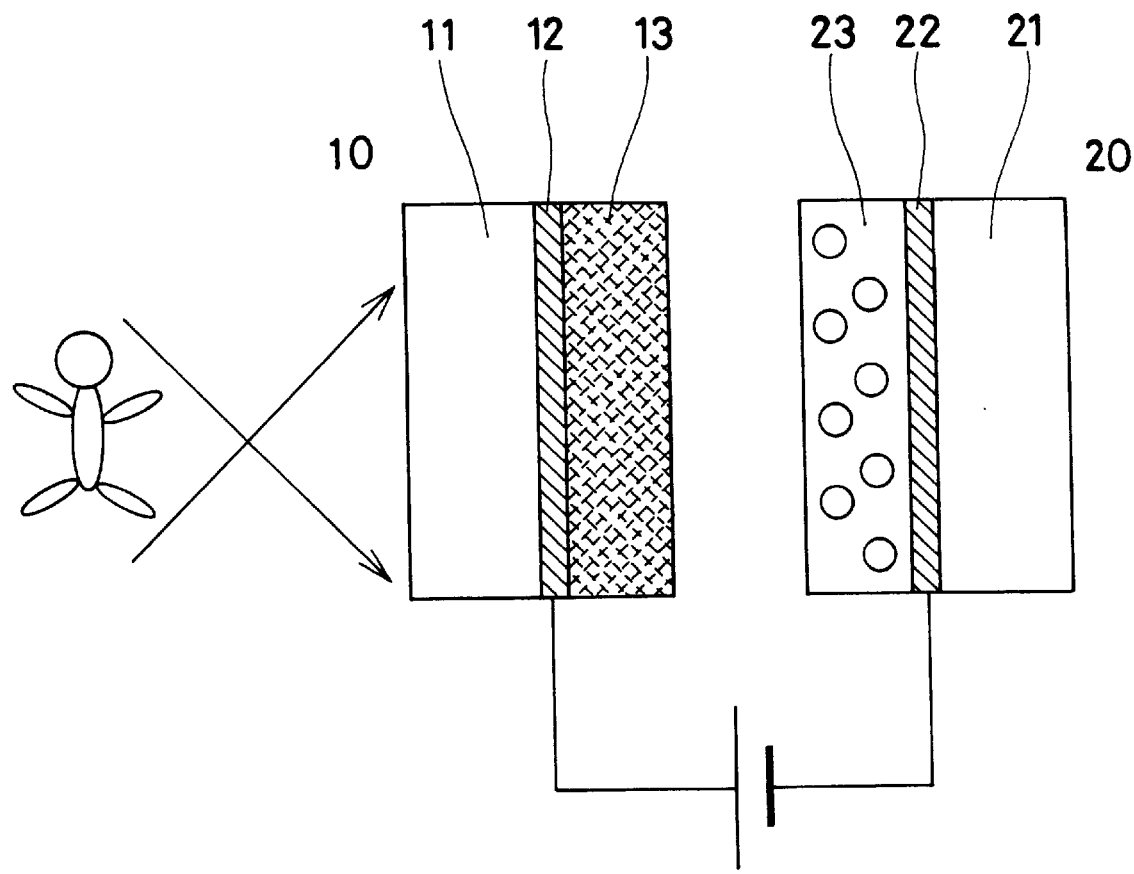
FIG. 1 shows a method for recording an image to a liquid crystal recording medium.
Figure 2A:
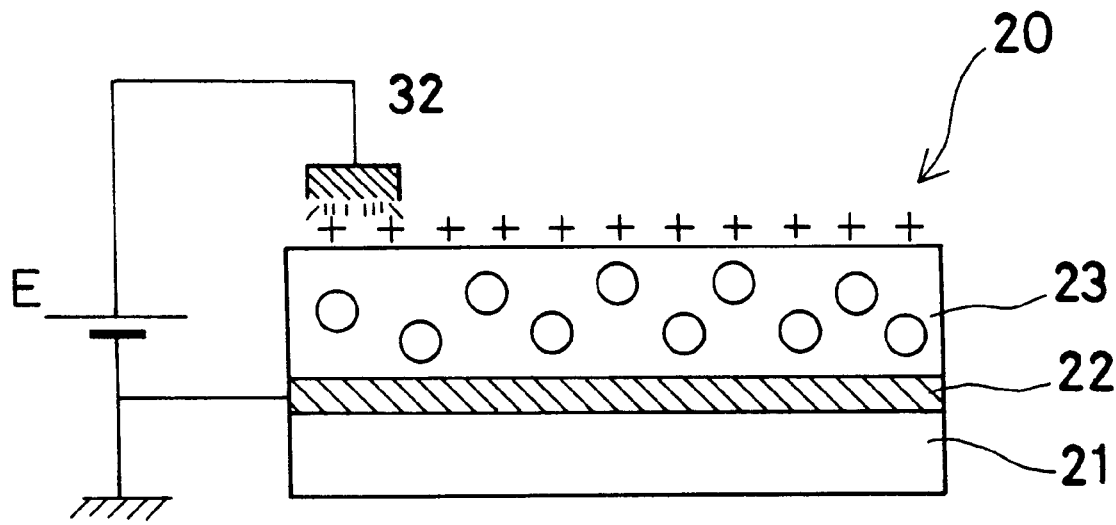
FIGS. 2(a) and 2(b) are drawings for explaining writing to the liquid crystal recording medium by heat.
Figure 2B:
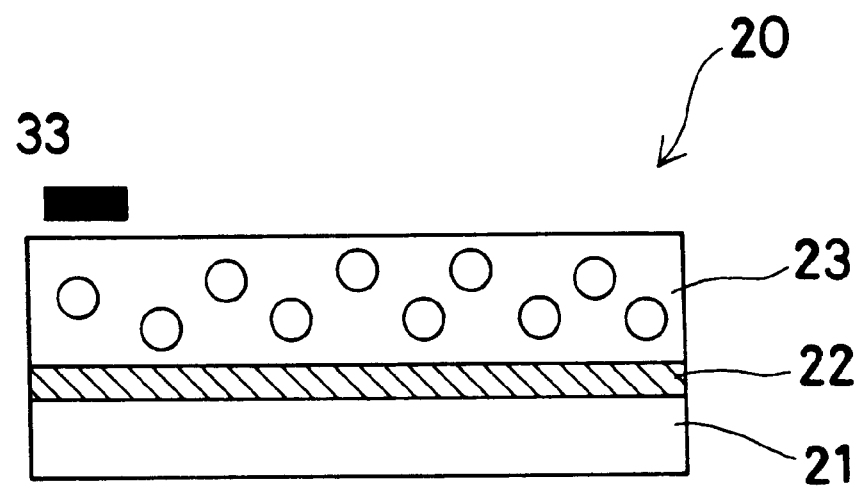

A mixture was prepared by adding 4.5 g of a multifunctional monomer dispentaerythritol hexaacrylate, M-400, manufactured by Toa Chemical Co., Ltd. to 5.5 g of a smectic liquid crystal (S-6, manufactured by BDH, and this was dissolved in 10 g of xylene and a 50% solution was obtained. To this solution, 0.3 g of a photo-curing initiator (2-hydroxy-2-methyl-1-phenylpropane-1-one, DAROCURE 1173, manufactured by Merck & Co., Inc.) was added as a polymerization initiator and 0.1 g of a surface-active agent (FLUORORAD FC-430, manufactured by Sumitomo 3M Co., Ltd.) was added as a surface active agent. Then, as shown in FIG. 1, this was coated on a glass substrate 11 (resistivity 100 Ω/□) where ITO transparent electrode 12 has been deposited to a thickness of about 1000 Å by a spinner to prepare a polymer/liquid crystal composite layer 13. This was dried in a vacuum oven maintained at about 50° C. and ultraviolet light of about 300 mJ/cm$^2$ was irradiated. As a result, a whitish opaque liquid crystal recording medium 1 with film thickness of 6 μm was obtained.

EXAMPLE 2

As shown in FIG. 1, the liquid crystal recording medium 20 prepared in Example 1 was placed face-to-face to a photosensitive member 10, which comprises a laminated organic photosensitive layer (electric charge generating layer; electric charge transport layer) coated on a glass 21 provided with ITO transparent electrode 22, with a polyimide spacer film (not shown) of about 10 μm thick between them. Image exposure was performed from the direction of the photosensitive member and rectangular voltage of 900 V was applied from a power source 30 for 80 msec at the same time. Thus, an image was formed on the liquid crystal recording medium 20.

EXAMPLE 3

The image recorded by the method of Example 2 was read by a film scanner (Nikon; LS-3500), and this was printed by a sublimation transfer printer (JVC; SP-5500). When images read by 4 types of reading light, i.e. R, G, B and white light, were compared, the image read by B light was the most satisfactory.

EXAMPLE 4

Figure 8:
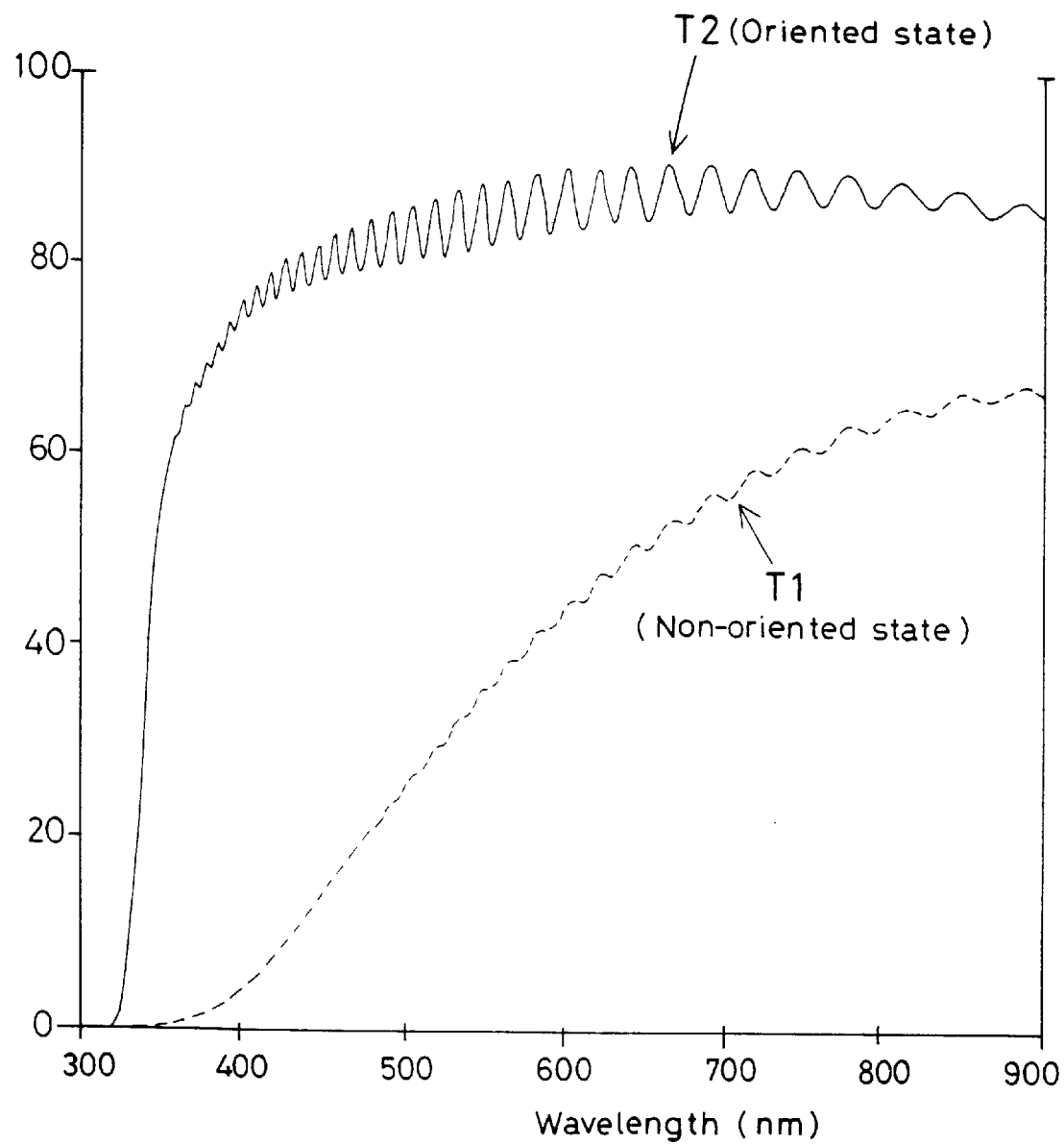
FIG. 8 is a diagram showing the transmittance property of a polymer dispersion liquid crystal recording layer.

The liquid crystal recording medium 1 of Example 1 was placed face-to-face to a glass where an aluminum electrode had been deposited with a polyimide film spacer of 10 μm thick between them, and voltage of 800 V was applied for 0.1 sec. Then, the liquid crystal was oriented and turned to transparent. The dependency of transmittance on wavelength was examined on the oriented transparent portion and non-oriented portion. Transmittance T2 of the oriented portion and transmittance T1 of the non-oriented portion were obtained as shown in FIG. 8. The measurement was performed by a spectroscope (Shimadzu; UV-240). As it is evident from FIG. 8, the longer the wavelength is, the transmittance of the non-oriented portion increases, and the shorter the wavelength is, the more the contrast increases. Since absorption of ITO glass is high and contrast cannot be obtained at a short wavelength of less than 320 nm, the contrast reaches the highest value in the range of 320–500 nm, or more preferably, in the range of 330–400 nm.

EXAMPLE 5

Modulation (contrast) of the oriented portion and magnitude of granularity noise of the non-oriented portion were measured in each wavelength range of R, G and B, and the results were compared.

Figure 3:
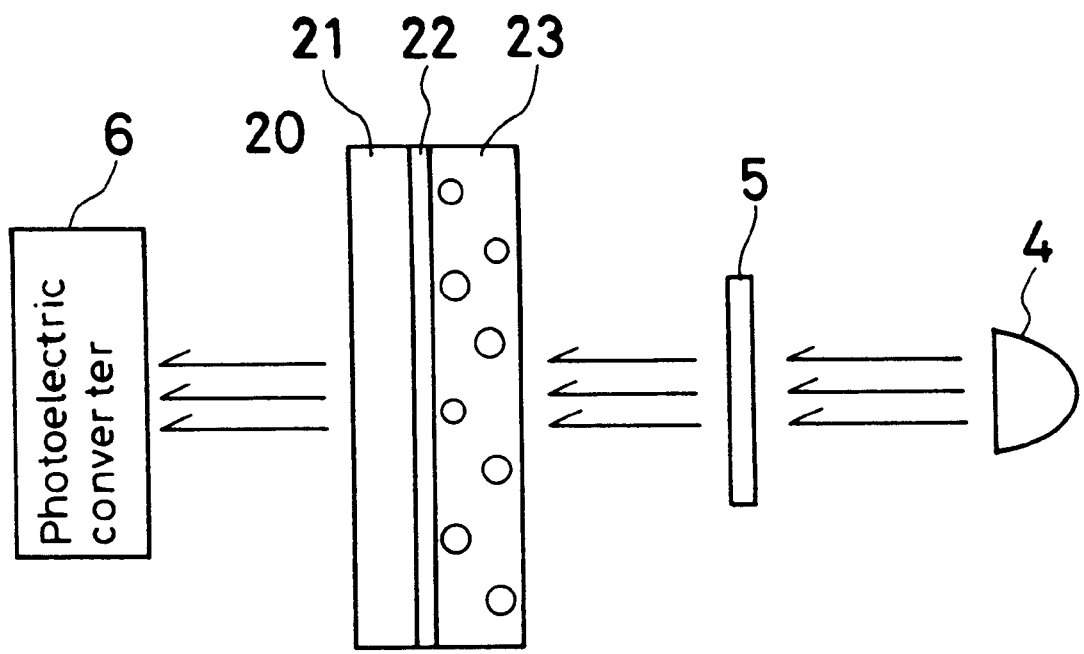
FIG. 3 shows a method for reading the recorded image.
Figure 4:
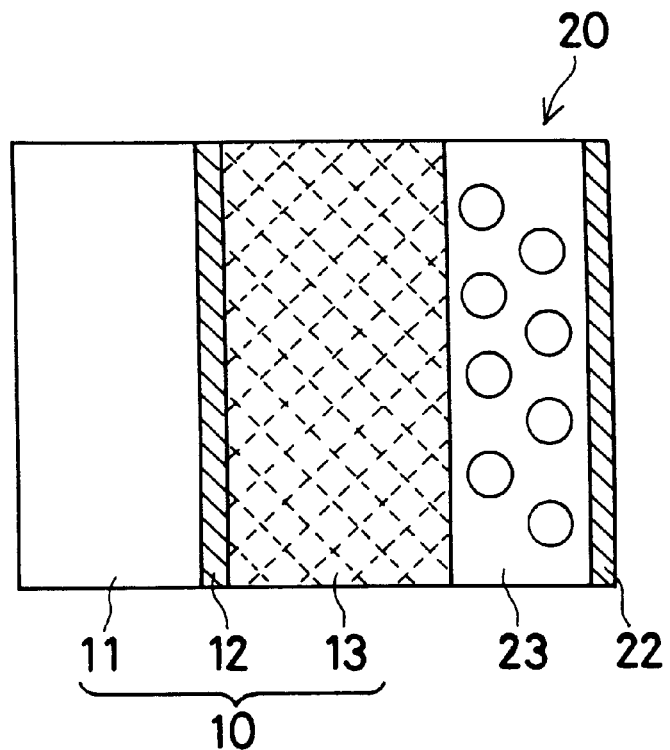
FIG. 4 represents an integrated type liquid crystal recording medium.
Figure 5:
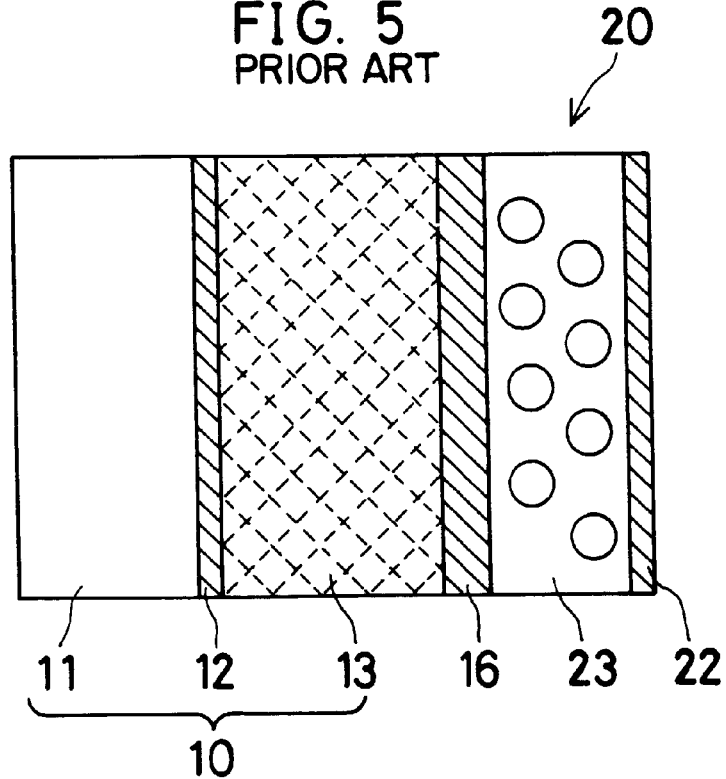
FIG. 5 represents an integrated type liquid crystal recording medium.
Figure 6:
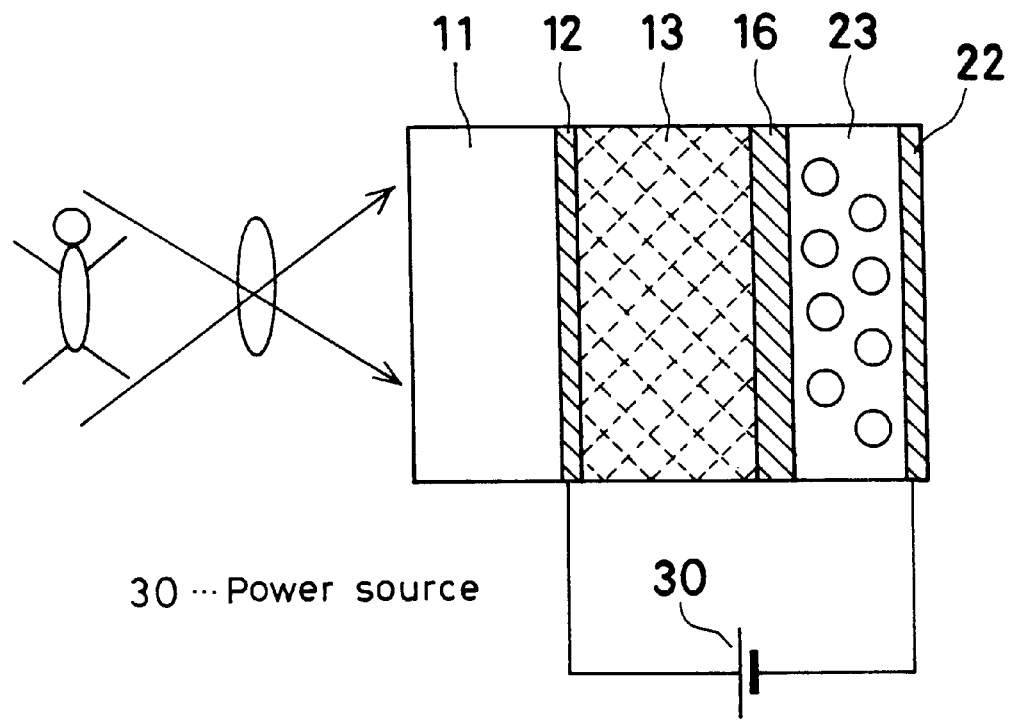
FIG. 6 shows a method for writing on the integrated type liquid crystal recording medium.
Figure 7:
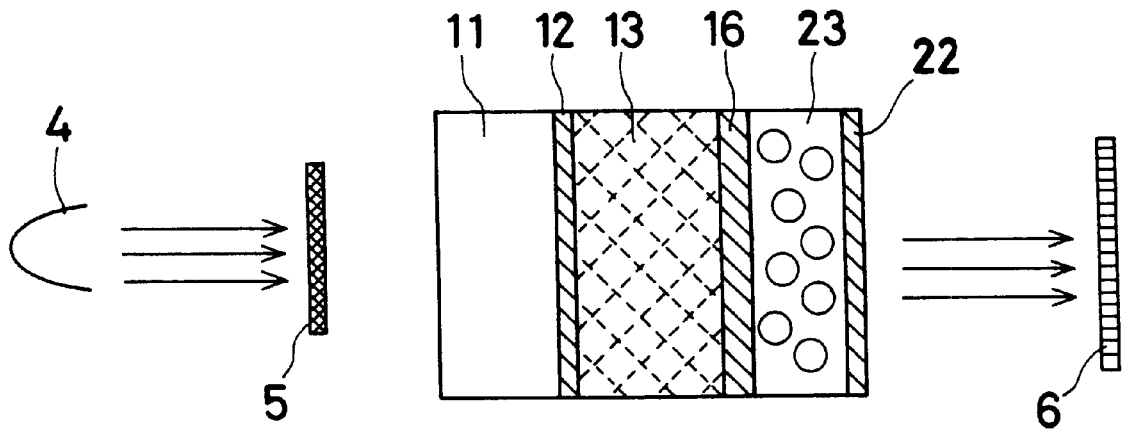
FIG. 7 shows a method for reading the integrated type liquid crystal recording medium.
Figure 9:
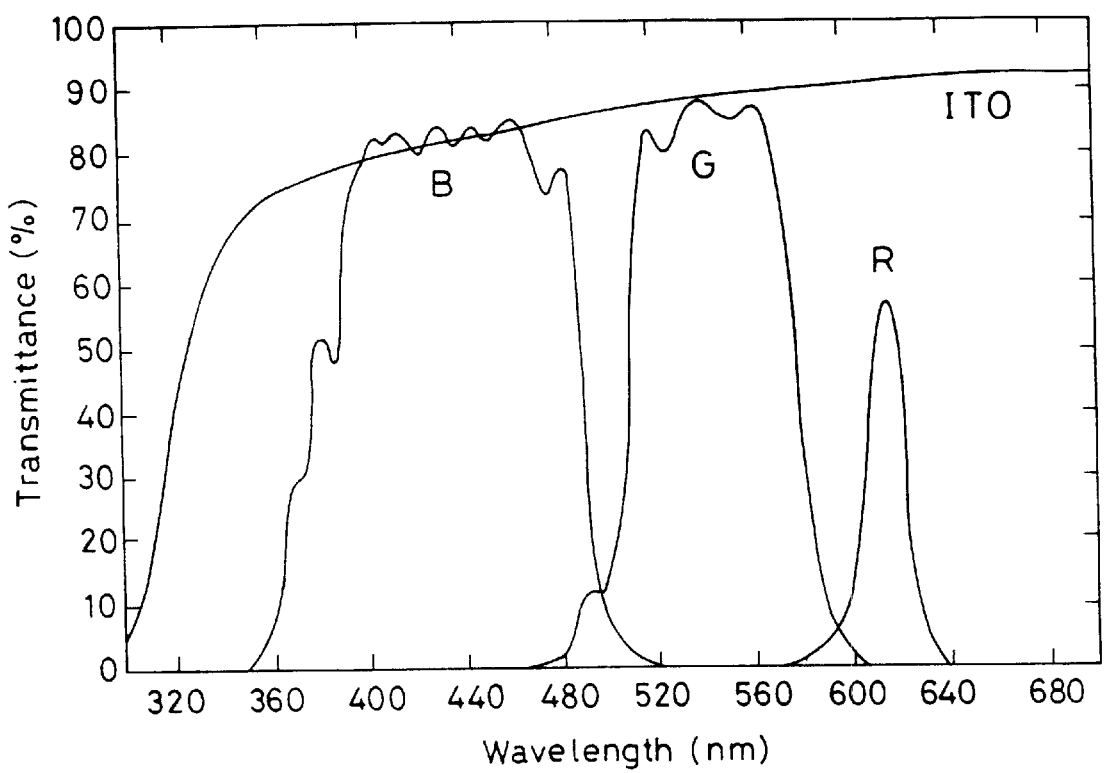
FIG. 9 is a diagram showing the filtration property.

The measurement was performed by a CCD camera system (Hamamatsu Photonics; C-1000). As shown in FIG. 3, light from a light source 4 was irradiated on a liquid crystal recording medium 1 through R, G and B color filter 5, and the light source was adjusted so that the intensity when light enters the medium will be the same. As the color filter, a filter having a transmittance property as shown in FIG. 9 was used. Transmission light was magnified under a light microscope, and this was measured by a photoelectric converter 6 on the medium at a sample spacing of about 2 μm. The magnitude of noise was defined by the following equation:

$$N^2 = \Sigma(T-Tav)^2/L,$$

where L is number of samples, and Tav represents average transmittance.

Figure 10:
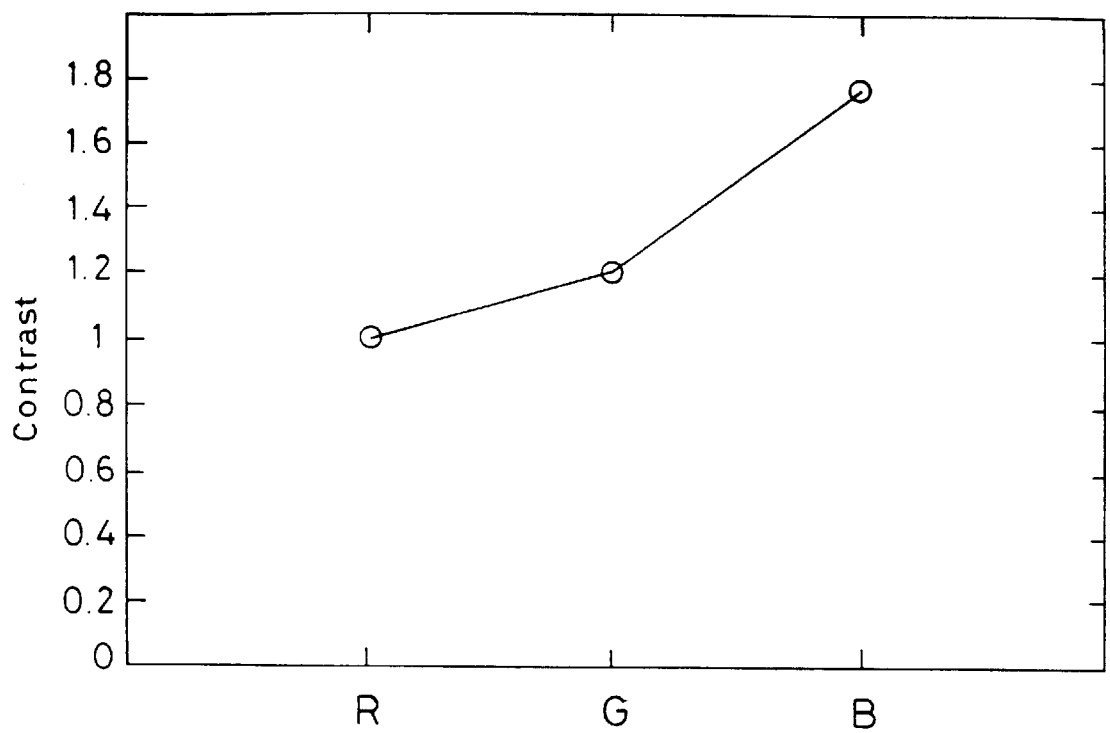
FIG. 10 is a diagram showing the contrast relative value when reading by R, G and B light.

The contrast is a relative value when R light was regarded as 1 as shown in FIG. 10 and reached the highest value in the B range. On the other hand, as shown in FIG. 11, the magnitude of noise reached the highest value in the G range in relative value when R light was regarded as 1, and the most satisfactory results were obtained in the B range.

Figure 11:
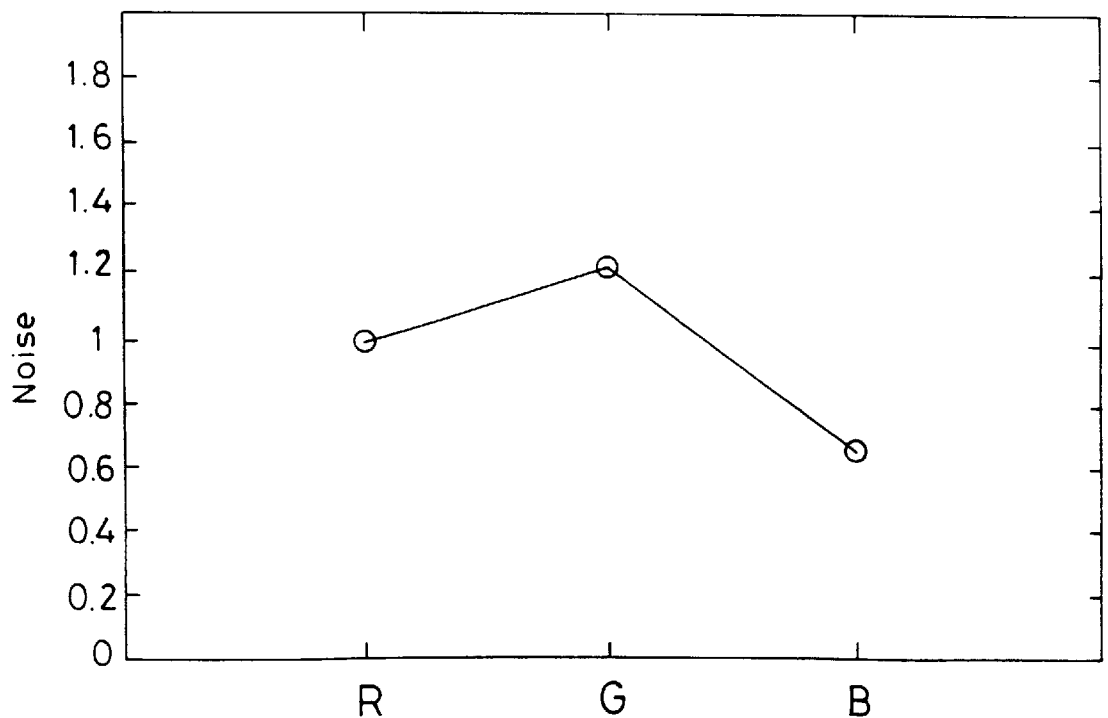
FIG. 11 is a diagram showing the noise relative value when reading by R, G, and B light.
Figure 12:
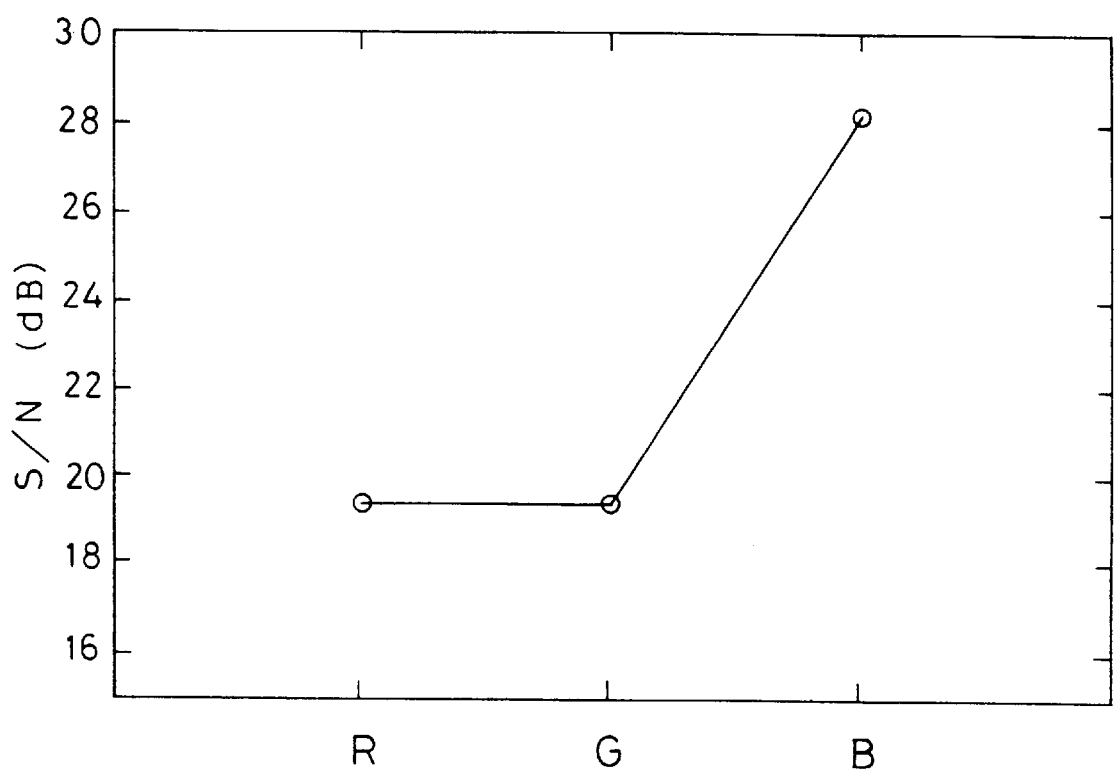
FIG. 12 is a diagram showing the S/N ratio when reading by R, G and B light.

From the results of FIG. 10 and FIG. 11, the S/N property was the most satisfactory in the B range as shown in FIG. 12.

[Preparation of the Information Recording Medium]

EXAMPLE 6

As electric charge generating material, 3 parts by weight of pyrrolopyrrole type pigment having the following structure and 1 part by weight of polyvinylbutyral resin were mixed with 196 parts by weight of 1,2-dichloroethane. The mixture was mixed well by a mixer, and a coating solution was prepared.

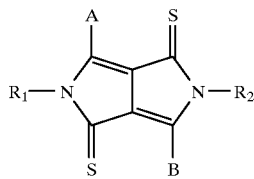

This solution was coated on the ITO side of a glass substrate having an ITO transparent electrode (500 A thick; resistivity 80 Ω/□), and this was dried at 100° C. for one hour to form an electric charge generating layer of 0.3 μm thick.

Next, as electric charge transport material, 3 parts by weight of enamine derivative having the following structure and 1 part by weight of polystyrene resin were mixed with and dissolved in 170 parts of a mixing solvent (containing dichloromethane and 1,2-trichloroethane at a ratio of 68:102), and a coating solution was prepared. This solution was coated on the above electric charge generating layer, and this was dried at 80° C. for two hours, and an electric charge transport layer of 10 μm thick was formed.

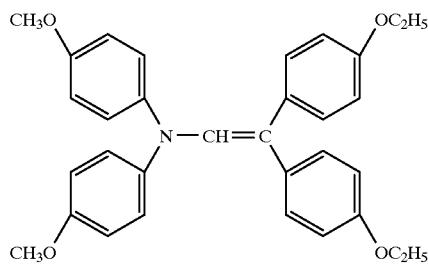

Figure 13:
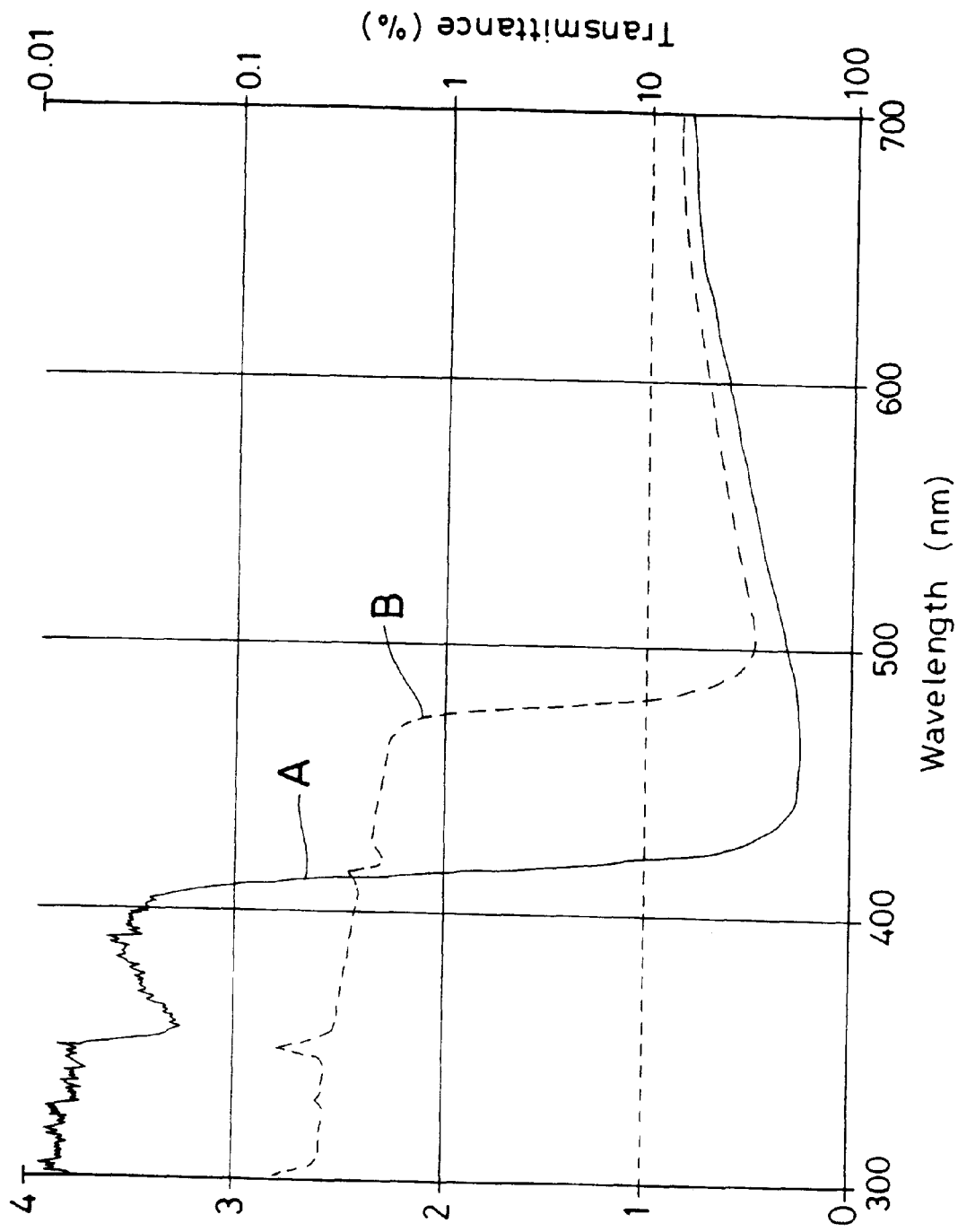
FIG. 13 is a diagram showing results of absorption spectrum measurement of a photosensitive member layer.

On the photosensitive member thus prepared, the absorption spectrum was measured. To measure the absorption spectrum, a spectroscope (Shimadzu; UV-240) was used. The results are shown in FIG. 13 as the property A. Transmittance of more than 10% was observed at a wavelength of 420 nm or longer.

EXAMPLE 7

To the electric charge transport layer of the photoconductive layer of Example 6, diparaxylylene having the following structure was vaporized and polymerized under a vacuum condition, and poly(monochloroparaxylylene) of 0.6 μm thick was prepared, and a dielectric layer was formed.

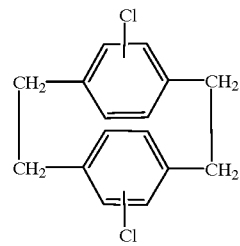

Further, on this dielectric member layer, a mixture containing 4 parts of dipentaerythrytol hexacrylate, 6 parts of smectic liquid crystal S6 (Merck Inc.), 0.2 part of fluorine type active agent Florade FC-430 (3M Company), and 0.2 part of photopolymerization initiator Darocure 1173 (Merck Inc.) was adjusted with xylene to have solid content of 30 percent by weight. This solution was coated on the dielectric member with a gap thickness of 50 μm by a blade coater. This was maintained at 50° C. and ultraviolet light of 0.3 mJ/cm² was irradiated, and an information recording medium having an information recording layer of about 6 μm thick was prepared. On this information recording layer, ITO was laminated in a thickness of about 200 A as a transparent electrode by a sputtering method. Thus, the information recording medium of the present invention was prepared.

[Information Recording Method]

EXAMPLE 8

The information recording medium prepared in Example 7 was exposed to a gray scale from the direction of the photoconductive layer and DC voltage of 600 V was applied between the two electrodes for 60 msec so that the photoconductive layer side is positive, and a transmission image corresponding to the gray scale was formed on the information recording medium. For the exposure, light of the visible range was used.

[Information Reader]

EXAMPLE 9

A light source having blue light or ultraviolet light or both is used. Here, ultraviolet light is defined as the light in the wavelength range of 320 to 400 nm. As the light source, a xenon lamp, mercury xenon lamp, halogen lamp, etc. are used. A blue or ultraviolet band-pass filter is placed between the light source and the information recording medium, and the light having an unnecessary wavelength is cut off. The central wavelength of the band-pass filter is 320 nm or longer, and it must be set depending upon transmittance of the photoconductive layer. It is preferable that the central wavelength is closer to 340 nm and that transmittance of the photoconductive layer is higher, and that light transmits by 10% or more. There is no restriction on the half-power width of the filter, and it is preferably about 5 to 50 nm. As such a filter, a colored filter or interference filter may be used, or a combination of a plurality of these filters may be used.

The reading light passing through the information recording medium is projected on a photoelectric converter such as a CCD line sensor and is converted to an electric signal. There is no need that the reading light is projected in the same scale to the CCD sensor, and it may be projected by any scale factor.

[Information Reading]

EXAMPLE 10

Figure 14:
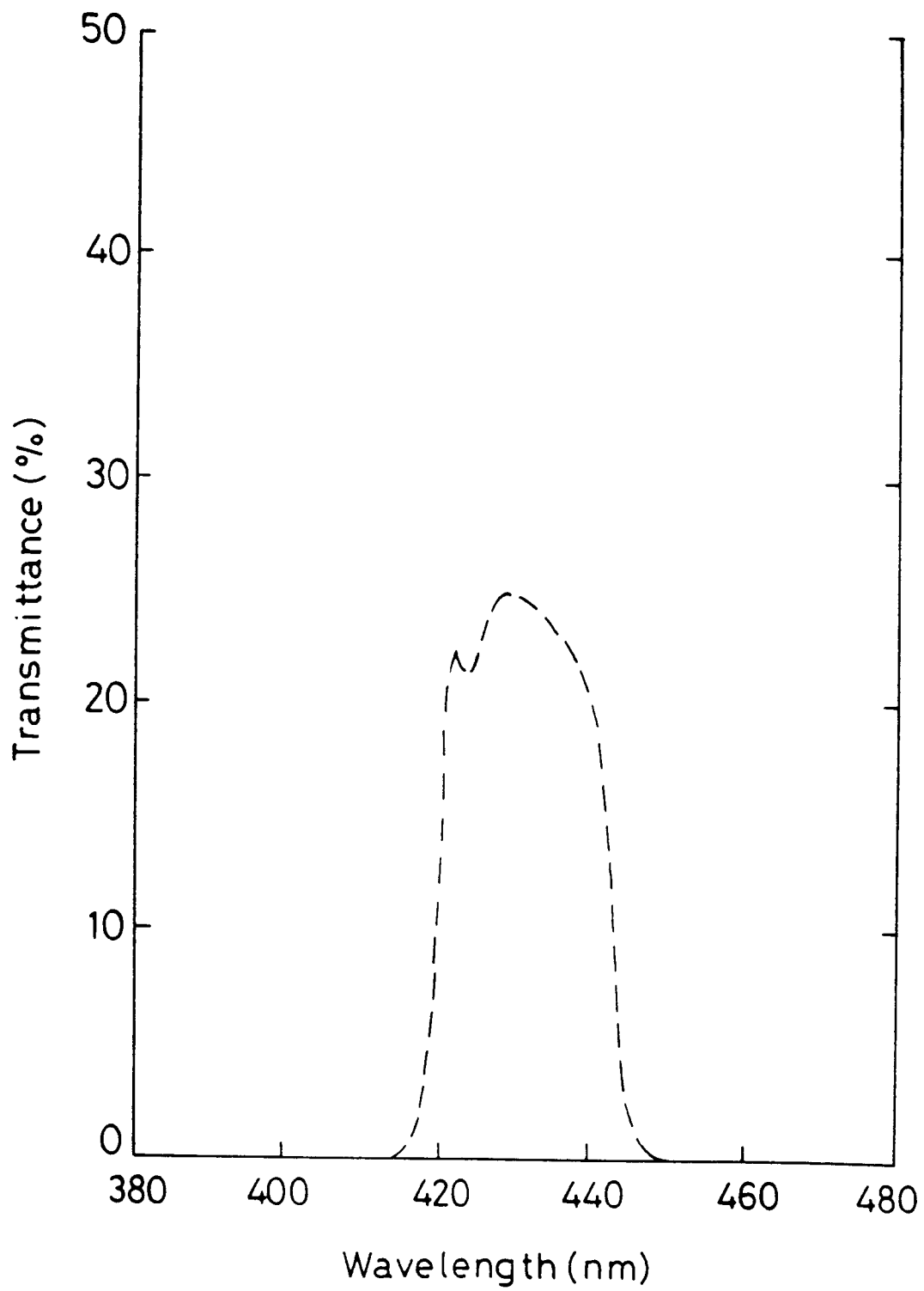
FIG. 14 is a diagram showing transmittance measurement of a band-pass filter of an image reader.

In an information reader using a xenon lamp as light source and a special interference filter of FIG. 14 as filter, a gray scale was recorded on the information recording medium of Example 7 by the method of Example 8, and this was projected on a CCD line sensor by the same scale and converted to an electric signal. When this was outputted by a heat-sensitive sublimation printer, an image with high quality and high contrast was obtained.

Comparative Example 1

Using an information reader similar to that of Example 10, reading light was directly irradiated on the information recording medium of Example 8 without the filter used in Example 10. When the image was read and was inputted by a heat-sensitive sublimation printer, an image with unsatisfactory contrast was obtained.

Comparative Example 2

A pyrrolopyrrole type pigment as in Example 6 was used as the electric charge generating layer and a butadiene type compound was used as the electric charge transport layer, and a photoconductive layer was formed on an electrode glass substrate with a ITO electrode prepared by the same method as in Example 6. When the absorption spectrum of the photoconductive layer was measured, the property B shown in FIG. 13 was obtained.

Comparative Example 3

On the electric charge transport layer of the photoconductive layer of Comparative Example 2, a dielectric member layer, a polymer dispersion liquid crystal layer and a transparent layer were laminated by the same method as in Example 7, and an information recording medium was prepared.

Comparative Example 4

When exposure and voltage application were performed on the information recording medium of Comparative Example 3 by the same method as in Example 8, a transmission image corresponding to a gray scale was formed. When this transmission image was read by a reader of Example 10, it was not possible to obtain an image having low transmission light quantity and good quality.

Comparative Example 5

When the information recording medium of Comparative Example 4 was read by a reader without filter as in Comparative Example 1, an image with low contrast was obtained.

[Preparation of Information Recording Medium]

EXAMPLE 11

A mixture containing 4 parts by weight of dipentaerythrytol hexacrylate, 6 parts by weight of smectic liquid crystal S6 (Merck Inc.), 0.2 part by weight of fluorine active agent FLUORAD FC-430 (3M Company), and 0.2 part of photopolymerization initiator DACROCURE 1173 (Merck Inc.) was adjusted with xylene to have solid content of 30 percent by weight.

This solution was coated on the ITO side of a glass substrate provided with an ITO transparent electrode (about 500 A thick; resistivity: 80 Ω/□) with a gap thickness of 50 μm by a blade coater. This was maintained at 50° C. and ultraviolet light of 0.3 mJ/cm$^2$ was irradiated. As a result, an information recording medium having an information recording layer of about 6 μm thick was prepared. From a cross-section of the information recording medium, liquid crystal was extracted using hot methanol. After drying, the internal structure was examined under a scanning electron microscope (Hitachi Ltd.; S-800; ×10,000), and it was found that the layer surface was covered by UV-setting resin of 0.6 μm thick, and resin particles of 0.1 μm in particle size were filled inside the layer.

[Method to Prepare the Photosensitive Member]

EXAMPLE 12

As electric charge generating material, 3 parts of fluorenone azo pigment having the following structure and 1 part of polyester resin were mixed with 196 parts of a mixing solvent containing dioxane and cyclohexane at a ratio of 1:1. This was mixed well by a mixer, and a coating solution was prepared.

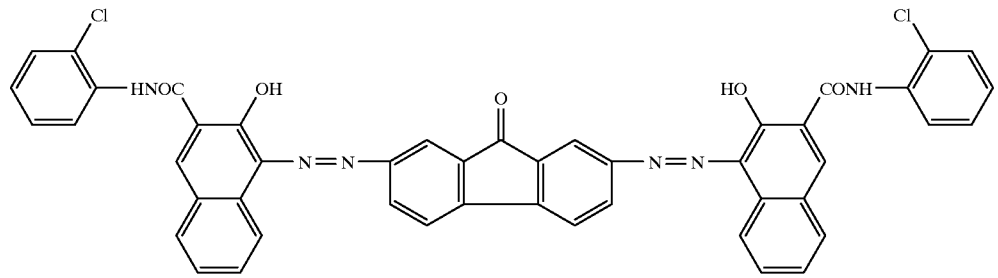

This solution was coated on the ITO side of a glass substrate having an ITO transparent electrode (about 500 A thick; resistivity: 80 Ω/□). After drying at 100° C. for one hour, an electric charge generating layer of about 0.3 μm thick was formed.

As electric charge transport material, 3 parts of paradimethylstilbene having the following structure and 1 part of polystyrene resin were mixed with and dissolved in 170 parts of a mixing solvent containing dichloromethane and 1,1,2-trichloroethane at a ratio of 68:102, and a coating solution was prepared. This solution was coated on the above electric charge generating layer. This was dried at 80° C. for two hours, and an electric charge transport layer of 10 μm thick was formed.

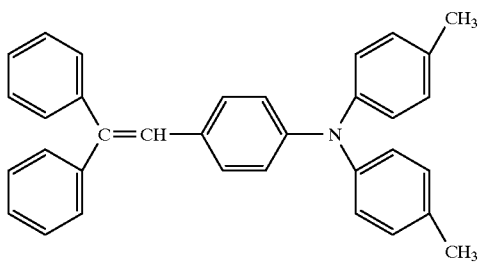

[Recording of Information]

EXAMPLE 13

The information recording medium and the photosensitive member thus prepared were placed face-to-face with a gap of about 10 μm between them, and image exposure was performed for about 33 msec from the direction of the transparent support member of the photosensitive member, and voltage of about 700 V was applied for 60 msec between electrodes of the photosensitive member and the liquid crystal recording medium with the photosensitive member on the positive side. After turning the voltage off, the two members were separated and the liquid crystal recording medium was examined. It was found that modulation occurred according to the exposure information.

[Reading of Image]

Next, description will be given on a method for reading an image thus obtained.

Figure 15:
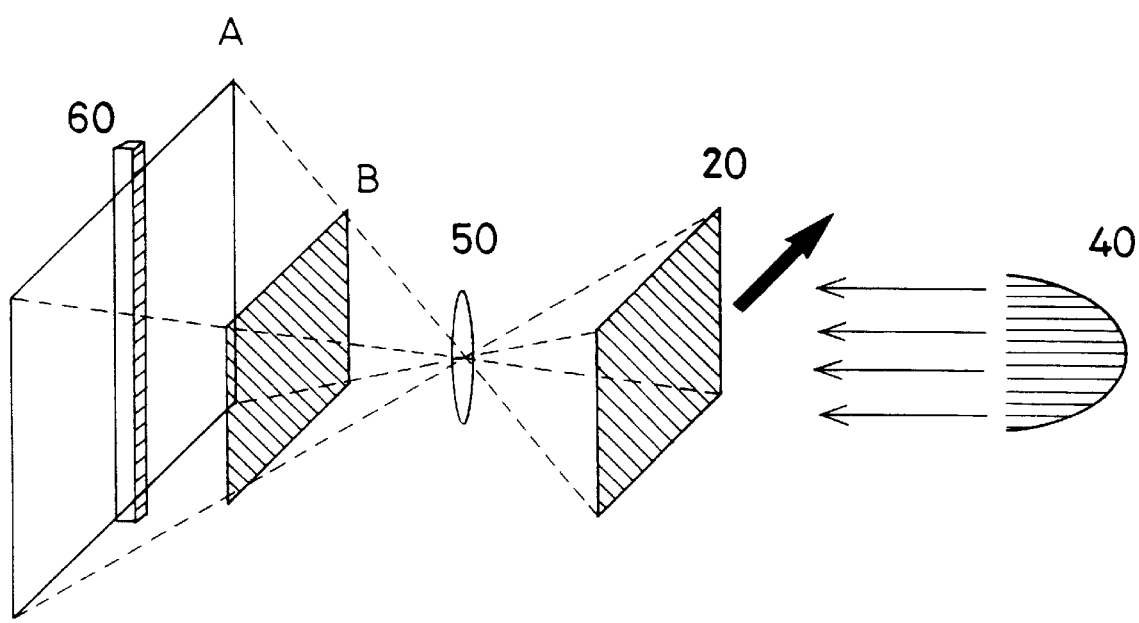
FIG. 15 shows a method for reading.

FIG. 15 shows projection of transmission light modulated on the liquid crystal recording medium to a photoelectric conversion device. The transmission light irradiated on a liquid crystal recording medium 20 from a light source 40 forms an image on the surface of a photoelectric conversion device 60 by an image forming lens 50. As the photoelectric conversion device 60, a CCD area sensor may be used, while it is preferable to use a CCD line sensor because of resolution. When CCD line sensor is used, only a part of the recorded image information is projected on the sensor, and to read the entire image, it is necessary to move the liquid crystal recording medium or CCD line sensor. In the latter case, the illuminating optical system and the reading optical system of the CCD line sensor should be moved at the same time. In the apparatus of the present invention, the liquid crystal recording medium is moved in the arrow direction by a distance corresponding to 1 line each time when 1 line is read by the CCD line sensor. The stage, on which the liquid crystal recording medium is placed, is driven by a stepping motor.

By adjusting the optical system, it is possible to project the image on the liquid crystal recording medium in the same size as shown in B of the figure, or to magnify it by a scale factor as desired as shown in A of the figure. By the magnifying projection, reading can be achieved at a higher accuracy than the resolution of a CCD sensor.

Figure 16:
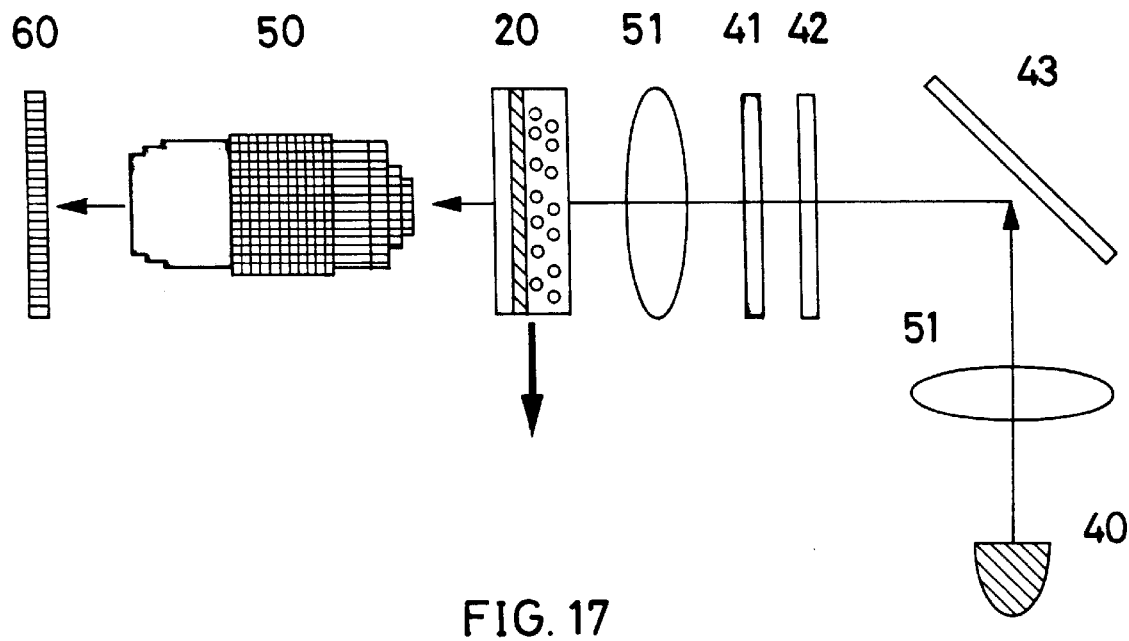
FIG. 16 shows a method for reading.
Figure 17:
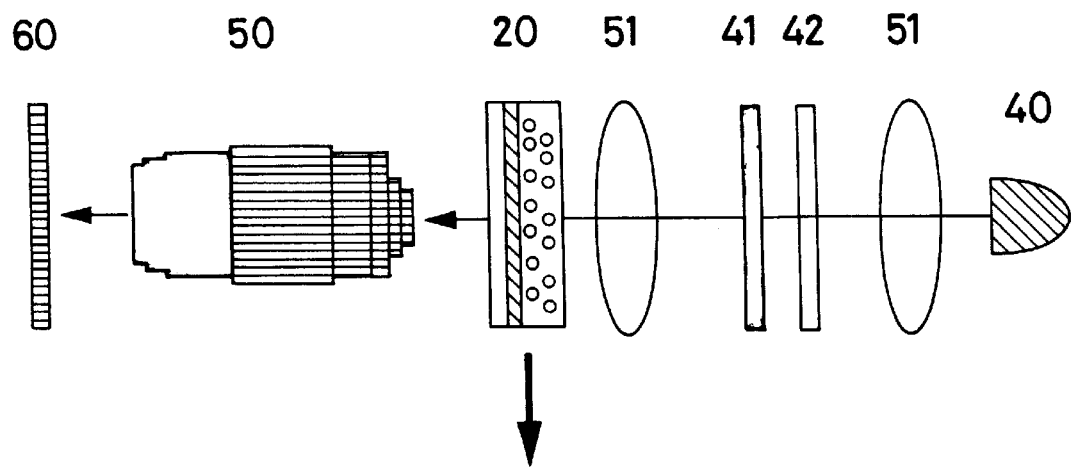
FIG. 17 shows a method for reading.

FIG. 16 and FIG. 17 each schematically illustrates a reader. From the light of the light source 40, only blue and ultraviolet lights taken out by a cold mirror 43 are directly irradiated on an infrared cut filter 42 and an ultraviolet band-pass filter 41, and only specific light of an ultraviolet wavelength is irradiated on the liquid crystal recording medium 20.

As the light source 40, a high-pressure xenon lamp (Hamamatsu Photonics; L2274) was employed. Also, a mercury xenon lamp, halogen lamp, etc. may be used.

A cold mirror (Andover Inc.; 375FV-86-50), infrared cut filter (Sigma Koki K.K.; HAF-50S-50H), and ultraviolet band-pass filter (Andover Inc.; 350FS-25-50) were used. The characteristics of ultraviolet band-pass filter were as shown in FIG. 14.

The ultraviolet band-pass filter is not limited to the filter having the characteristics of FIG. 14, and the characteristics of the suitable filter vary according to the condition to prepare the liquid crystal recording medium or the recorded image. The characteristics of the filter suitable for obtaining a satisfactory image are: 330 to 400 nm in central wavelength and 50 nm or less in half-power width. As the filter having such characteristics, an interference filter with laminated dielectric thin films, colored glass filter, or a combination of a plurality of these filters may be used.

The lens to form an image from transmission light on photoelectric conversion device must transmit ultraviolet light, and a lens system made of quartz glass or fluorspar may be used. As such lens, UV Nikkor (Nikon Inc.; 105 mm F4. 5S) was used.

Figure 18A:
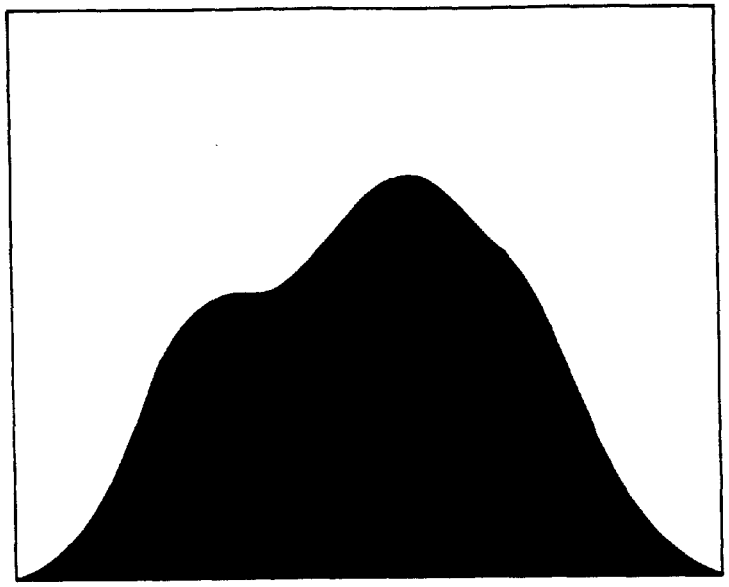
FIGS. 18(a) and 18(b) represent histograms when ultraviolet light or white light is irradiated.
Figure 18B:
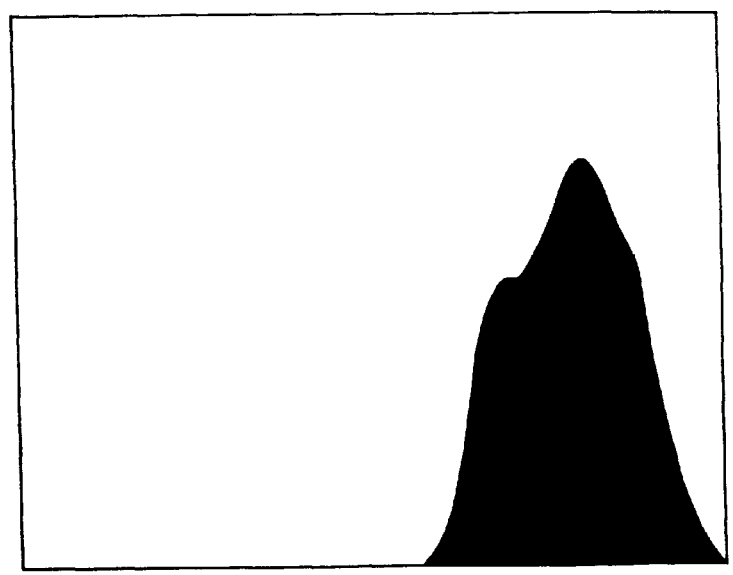

FIG. 18 shows histograms when ultraviolet light and white light are irradiated on the liquid crystal recording medium. The intensity of the light source was adjusted in such a manner that the signals in an oriented state will be the same. It was found that a wider dynamic range is obtained by irradiation of ultraviolet light than in the case of white light irradiation.

INDUSTRIAL APPLICABILITY

The use of blue light or ultraviolet light as reading light for a liquid crystal recording medium makes it possible to improve contrast, to reduce granularity noise, to achieve image reading with a high S/N ratio, and to widen the dynamic range. Also, the formation of a transparent photoconductive layer of the integrated type information recording medium to blue or ultraviolet light and the use of blue light or ultraviolet light with a wavelength of the reading light makes it possible to read the information recorded on the liquid crystal layer with sufficient contrast. This is very effective when it is utilized for an industrial application.

What I claim is:

1. An apparatus for reproducing information recorded on an information recording medium comprising an information recording layer having a liquid crystal layer and a UV-setting resin layer and arranged on an electrode layer, such that information is recorded on an information recording medium comprising an information recording layer having a liquid crystal layer and a UV-setting resin layer and arranged on an electrode layer, wherein an outer surface of said information recording layer is formed only by UV-setting resin, wherein a photosensitive member having a photoconductive layer is placed face-to-face to the information recording layer on a contact or non-contact basis, and information is written onto said information recording medium by light exposure under voltage application, whereby said information recording layer has a characteristic of transmitting ultraviolet light or blue light within a wavelength range of 320 to 500 nm, where an outer surface of said information recording layer is formed only by UV-setting resin, wherein the apparatus comprises an illuminating optical means for irradiating ultraviolet light or blue light within a wavelength range of 320 to 500 nm onto the information recording medium and a photoelectric converter for detecting transmission light transmitted by the information recording medium, wherein the photoelectric converter has a window made of window material;

wherein a smectic liquid crystal with a memory property is used in the liquid crystal layer.

2. The apparatus according to claim 1, wherein an image forming lens made of quartz glass or fluorspar is placed between said information recording medium and said photoelectric converter.

3. The apparatus according to claim 1, wherein quartz glass or fluorspar is used as window material of said photoelectric converter.

4. A method for reproducing information recorded on an information recording medium, wherein the information recording medium is an information recording medium comprising a photosensitive member having a photoconductive layer, a liquid crystal layer, and a UV-setting resin layer and arranged on an electrode, wherein an information recording layer is provided which is integrally laminated so as to provide an integrated information recording medium, wherein information is written on the integrated information recording medium by light exposure under voltage application, wherein said photoconductive layer can pass light having a wavelength of 420 nm or more, and wherein a smectic liquid crystal with a memory property is used in the liquid crystal layer, wherein said method comprises irradiating blue light within a wavelength range of 420 to 500 nm onto the information recording medium as a reading light, and reading the recorded information on the recording medium by transmission light, wherein ultraviolet light is also used as a reading light in reproducing information recorded in the recording medium.

5. A method for reproducing information according to claim 4, wherein the photoconductive layer comprises a charge generating layer and a charge transport layer.

6. A method for reproducing information recorded on an information recording medium comprising the steps of:

forming an information recording layer having a liquid crystal layer and a UV-setting resin layer and arranged on an electrode layer, such that information is recorded on an information recording medium comprising an information recording layer having a liquid crystal layer and a UV-setting resin layer and arranged on an electrode layer, wherein an outer surface of said information recording layer is formed only by UV-setting resin, wherein a photosensitive member having a photoconductive layer is placed face-to-face to the information recording layer on a contact or non-contact basis, and information is written onto said information recording medium by light exposure under voltage application, whereby said information recording layer has a characteristic of transmitting ultraviolet light or blue light within a wavelength range of 320 to 500 nm, wherein a smectic liquid crystal with a memory property is used in the liquid crystal layer, where an outer surface of said information recording layer is formed only by UV-setting resin, and reading the recorded information on the information recording medium by transmission light, wherein ultraviolet light is irradiated onto the recording medium as a reading light, wherein the reading light that is irradiated onto the information recording medium is ultraviolet light within a wavelength range of 320 to 400 nm.

* * * * *